US009760087B2

(12) United States Patent
Hoareau et al.

(10) Patent No.: US 9,760,087 B2
(45) Date of Patent: Sep. 12, 2017

(54) DISTRIBUTED, UNMANNED AERIAL VEHICLE PACKAGE TRANSPORT NETWORK

(71) Applicant: International Business Machines Corporation, Armonk, NY (US)

(72) Inventors: Guillaume Hoareau, Montpellier (FR); Johannes J. Liebenberg, Sandton (ZA); John G. Musial, Newburgh, NY (US); Todd R. Whitman, West Haven, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 147 days.

(21) Appl. No.: 14/598,281

(22) Filed: Jan. 16, 2015

(65) Prior Publication Data

US 2016/0209839 A1 Jul. 21, 2016

(51) Int. Cl.
*B64C 39/02* (2006.01)
*G05D 1/10* (2006.01)
(Continued)

(52) U.S. Cl.
CPC .......... *G05D 1/0027* (2013.01); *B64C 39/024* (2013.01); *G05D 1/104* (2013.01);
(Continued)

(58) Field of Classification Search
CPC ........ B64C 2201/128; B64C 2201/141; B64C 13/18; B64C 2201/066; B64C 2201/00; G05D 1/0011; G05D 1/0016
See application file for complete search history.

(56) References Cited

U.S. PATENT DOCUMENTS 6,648,272 B1 * 11/2003 Kothmann .............. B64B 1/005
244/30
6,665,582 B1 12/2003 Mortiz et al.
(Continued)

FOREIGN PATENT DOCUMENTS

CN 103274226 A 9/2013
WO WO 2013055265 A1 * 4/2013 ........... B64C 39/024
(Continued)

OTHER PUBLICATIONS

Eric Kulisch, "Package Wars," American Shipper, vol. 56, No. 1, Jan. 2014, 3 pages.

*Primary Examiner* — Thomas G Black
*Assistant Examiner* — Demetra Smith-Stewart
(74) *Attorney, Agent, or Firm* — Cantor Colburn LLP; John Pivnichny

(57) ABSTRACT

According to an aspect, a distributed package transport system includes unmanned aerial vehicles (UAVs), each of which is configured to transport packages within a geographic area and along a travel route. The system also includes UAV enclosures dispersed within the geographic area. The UAV enclosures include a number of cells, each of which provides a receptacle to temporarily house a UAV. At least one of the UAV enclosures is dynamically assigned to a location within the geographic area. Each of the UAV enclosures includes a computer processor and communication network interface and, for each of the UAVs in transit, the UAV enclosures communicate information specifying an origination point, drop off point, and return point amongst each other and coordinate to define, based on locations of the UAV enclosures and capacities of the UAV enclosures, a refined travel route including a subset of the UAV enclosures to serve as hops.

20 Claims, 9 Drawing Sheets

(51) Int. Cl.
*G05D 1/00* (2006.01)
*G08G 5/00* (2006.01)
*G06Q 10/00* (2012.01)
*B64F 1/22* (2006.01)

(52) U.S. Cl.
CPC ........... *G06Q 10/00* (2013.01); *G08G 5/0013* (2013.01); *G08G 5/0026* (2013.01); *G08G 5/0043* (2013.01); *G08G 5/0056* (2013.01); *G08G 5/0069* (2013.01); *G08G 5/0091* (2013.01); *B64C 2201/027* (2013.01); *B64C 2201/066* (2013.01); *B64C 2201/128* (2013.01); *B64C 2201/146* (2013.01); *B64C 2201/20* (2013.01); *B64C 2201/201* (2013.01); *B64F 1/222* (2013.01); *G05D 1/101* (2013.01)

(56) References Cited

U.S. PATENT DOCUMENTS

| | | | |
|---|---|---|---|
| 8,103,398 B2 | 1/2012 | Duggan et al. | |
| 8,146,854 B2 | 4/2012 | Lawrence | |
| 8,393,286 B2 * | 3/2013 | Rooney, III | B63B 59/08 114/221 R |
| 8,439,301 B1 * | 5/2013 | Lussier | B64F 1/02 244/63 |
| 8,543,265 B2 | 9/2013 | Ekhaguere et al. | |
| 9,051,043 B1 * | 6/2015 | Peeters | B64C 19/00 |
| 2006/0249622 A1 * | 11/2006 | Steele | B64F 1/04 244/115 |
| 2011/0084162 A1 | 4/2011 | Goossen et al. | |
| 2014/0032034 A1 | 1/2014 | Raptopoulos et al. | |
| 2014/0061377 A1 | 3/2014 | Smith | |
| 2015/0266575 A1 * | 9/2015 | Borko | B64C 39/024 701/3 |
| 2016/0137293 A1 * | 5/2016 | Santangelo | B64C 25/00 244/50 |
| 2016/0376031 A1 * | 12/2016 | Michalski | B64F 1/36 701/15 |

FOREIGN PATENT DOCUMENTS

| | | | | |
|---|---|---|---|---|
| WO | WO 2015105554 A1 * | 7/2015 | ........... | B64C 39/024 |
| WO | WO 2016137982 A1 * | 9/2016 | ........... | B64C 39/024 |

* cited by examiner

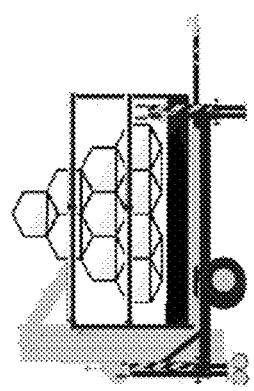
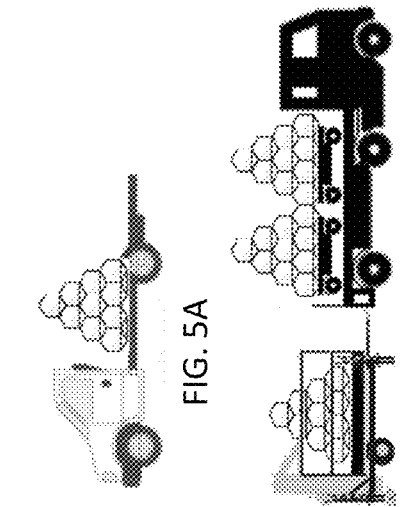
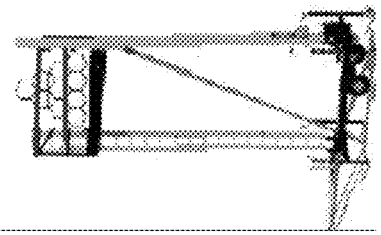
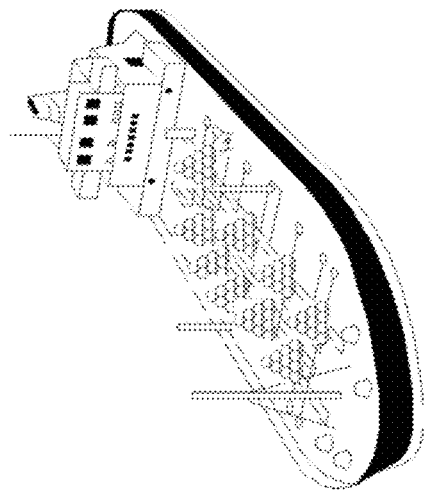
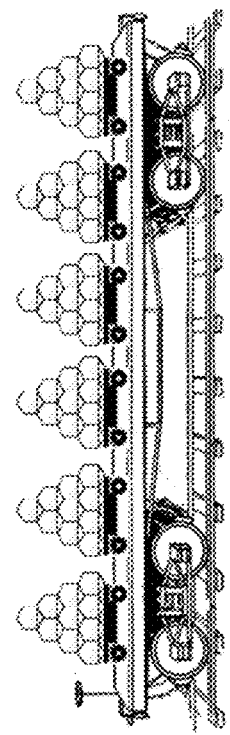
FIG. 5A  FIG. 5B  FIG. 5C  FIG. 5D  FIG. 5E  FIG. 5F

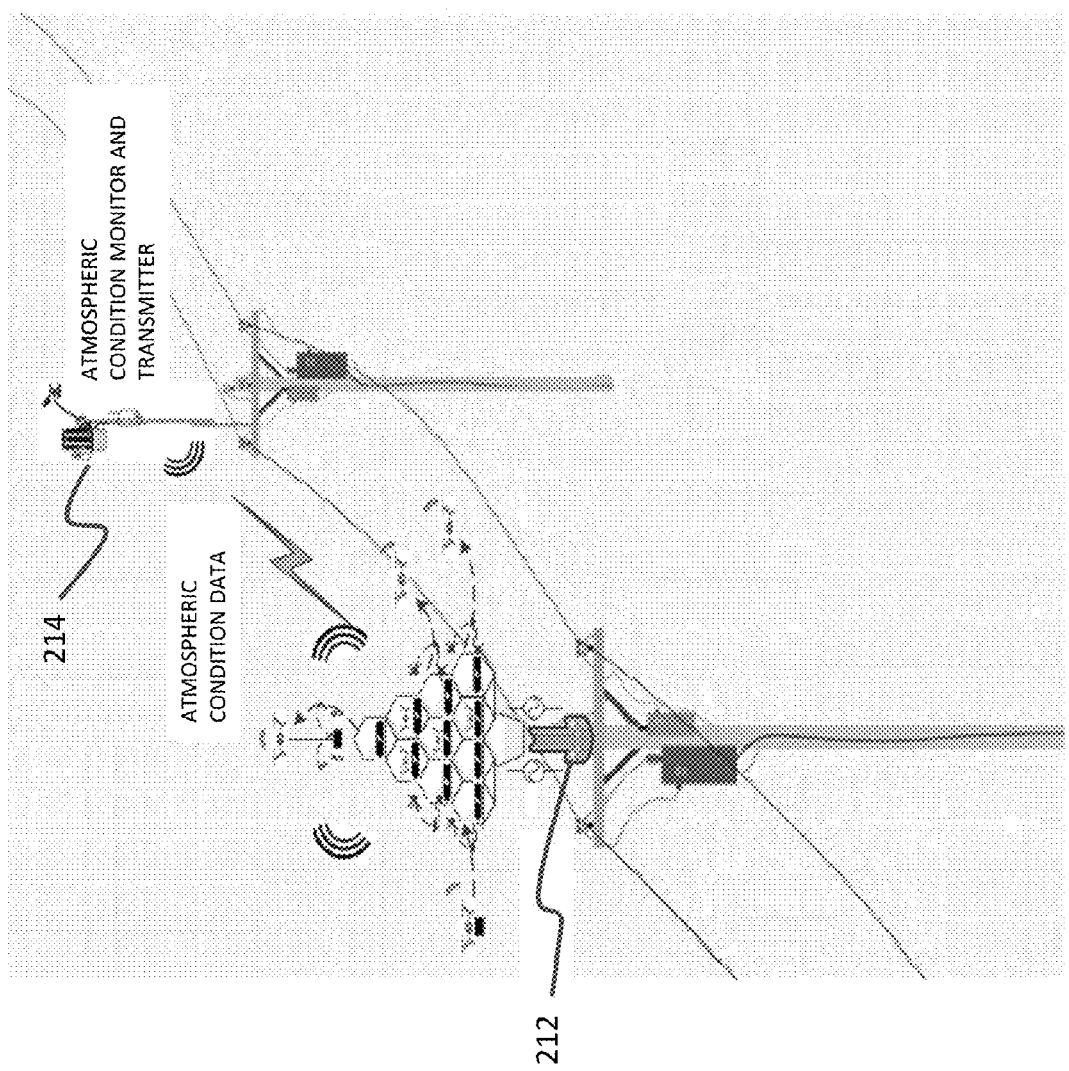

DISTRIBUTED, UNMANNED AERIAL VEHICLE PACKAGE TRANSPORT NETWORK

BACKGROUND

The present disclosure relates generally to package transport services, and more specifically, to package transport services by an unmanned aerial vehicle (UAV) distribution network.

UAVs, sometimes referred to as drones, are used for a variety of activities, such as surveying remote and/or expansive areas, e.g., power lines, pipelines, and wetlands, to name a few. More recently, the prospect of utilizing UAVs for distributing packages has been explored, e.g., in a commercial setting or to provide supplies or other needed items in support of non-commercial operations to areas that may be difficult to reach by other types of transportation. The ability to transport goods to consumers by UAVs offers great value, e.g., in terms of reducing traffic congestion associated with ground transport vehicles, as well as providing the ability to obtain access to areas in which delivery vehicles are limited (e.g., mountainous terrain, remote camping locations, crowded beaches, etc.).

SUMMARY

Embodiments include a system, method, and computer program product for implementing a distributed package transport system. The system includes a plurality of unmanned aerial vehicles (UAVs), each of which is configured to transport packages within a geographic area and along a travel route that includes an origination point, a package drop off point, and a post-drop off return point. The system also includes a plurality of UAV enclosures geographically dispersed within the geographic area. Each of the UAV enclosures including a plurality of cells, and each of the cells include a receptacle for providing temporary housing to a corresponding UAV. The receptacle has electrical circuitry to recharge the corresponding UAV. At least one of the plurality of UAV enclosures is dynamically assigned to a location within the geographic area. The system further includes a plurality of structures communicatively coupled to corresponding UAV enclosures. The UAV enclosures are configured to recharge the UAVs by electrical power provided by the structures through the electrical circuitry of the cells of the UAV enclosures. Each of the plurality of UAV enclosures includes a computer processor and communication network interface and, for each of the UAVs in transit, the UAV enclosures communicate information specifying the origination point, the drop off point, and the return point amongst each other and coordinate to define, based on locations of the UAV enclosures and capacities of the UAV enclosures, a refined travel route including a subset of the UAV enclosures to serve as hops.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 5A-5F depict sample mobile structures used for accommodating and transporting the UAV enclosures in accordance with an embodiment;

FIG. 6 depicts a view of a UAV enclosure in accordance with an alternative embodiment;

DETAILED DESCRIPTION

Embodiments described herein can be utilized for unmanned aerial vehicle (UAV)-implemented distributed package transport services. Currently, most UAVs have limited range and flight time duration. The distributed package transport services described herein provide a solution whereby the range and flight time of UAVs can be extended indefinitely by modifying existing infrastructure to house a UAV regeneration transfer point, referred to herein as a UAV enclosure, or hive. The UAV enclosure may be affixed atop existing infrastructure components such as cell towers, radio towers, telephone poles, highway signage, etc. These infrastructure components generally contain an electrical element which could be utilized to power the UAV enclosure. In another embodiment, the UAVs may be dynamically assigned to geographic locations using mobile vehicles to transport the UAVs to designated locations.

UAVs can be docked safely within the UAV enclosure until an instruction is given to conduct commerce or other transport function. UAV enclosures may communicate with each other to calculate flying time of UAVs and the fewest number of hops to ensure delivery range and completion of transport functions. The enclosures may be secured allowing only authorized UAVs to enter the enclosures to utilize its services.

Figure 1:
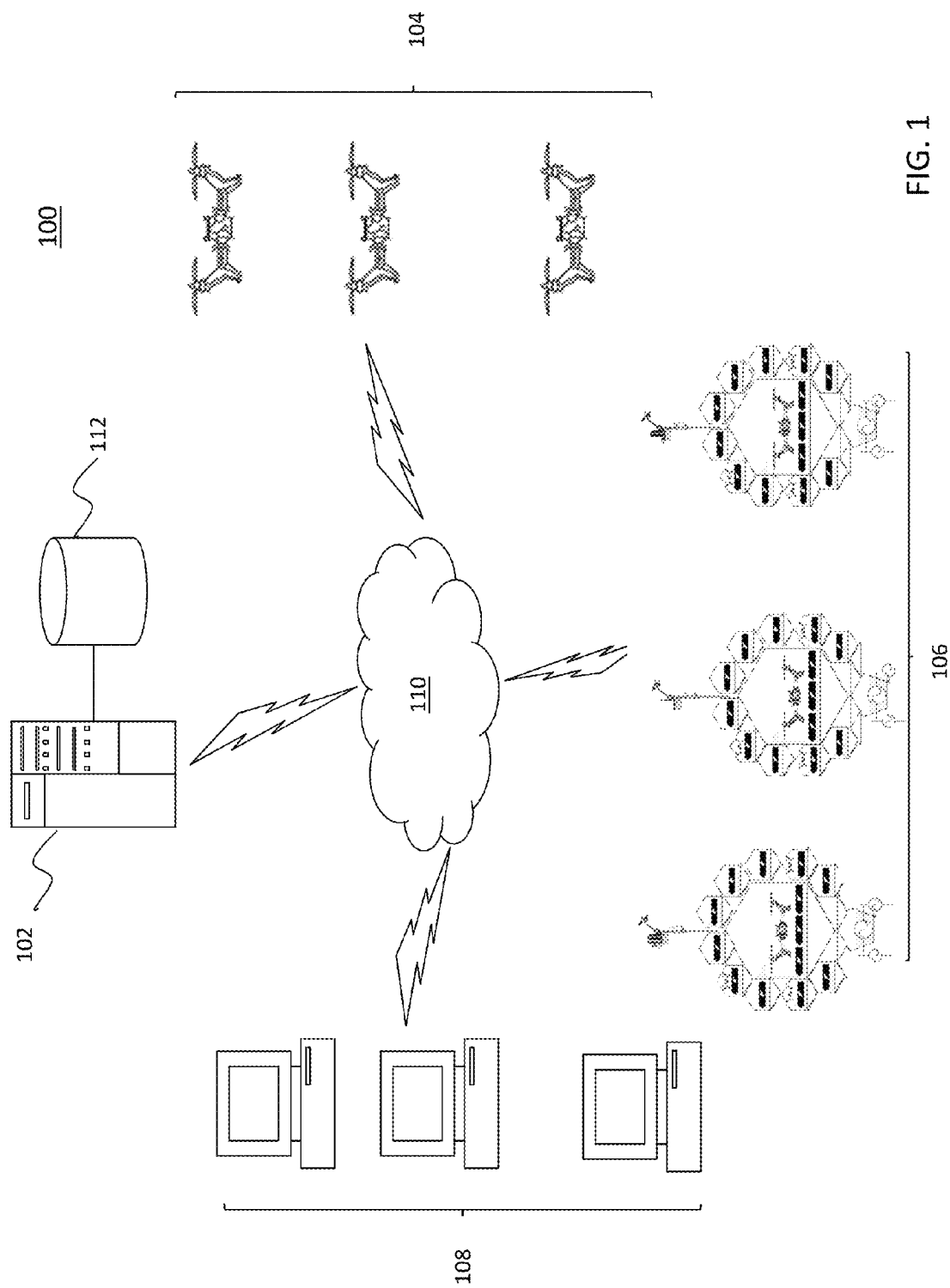
FIG. 1 depicts a high level view of a system for performing distributed package transport services in accordance with an embodiment.

Turning now to FIG. 1, a high level view of a system 100 for performing the distributed package transport system services is generally shown in accordance with an embodiment. The system 100 includes a host system computer 102, UAVs 104, UAV enclosures 106, and dispatch computer systems 108, each of which is communicatively coupled to one or more networks 110.

The host system computer 102 may be implemented as one or more high-speed computer processing devices, such as one or more mainframe computers capable of handling a high volume of activities conducted on behalf of end users of the distributed package transport services. In an embodiment, the host system computer 102 centrally manages the distributed package transport services described herein.

In one embodiment, the host system computer 102 may be implemented by an entity that provides goods and services to consumers. Alternatively, the host system computer 102 may be implemented by a third-party service provider that provides the distributed package transport services as an intermediary between a seller entity (e.g., dispatch computer systems 108) and the consumers. In another embodiment, the host system computer 102 may be implemented by a non-commercial entity, e.g., for situations in which packages (such as food or medical supplies) need to be transferred between locations as part of an emergency condition where first responders are unable to gain access to various roads or locations. For purposes of illustration, the distributed package transport services are described herein with respect to a commerce application.

A storage device 112 may be coupled directly to the host system computer 102. Alternatively, the storage device 112 may be coupled to the host system computer 102 through one or more of the networks 110. The storage device 112 stores a variety of data used by the host system computer 102 in implementing the distributed package transport services described herein. For example, the storage device 112 may store orders for goods generated for end users (e.g., if the host system computer 102 is a seller of goods). If the host system computer 102 is a third-party service provider for other sellers of goods, the storage device 112 may store account records for these sellers, as customers or subscribers of the distributed package transport services offered by the host system computer 102. Transaction records may be maintained for completed deliveries on behalf of sellers, such that invoicing can be performed and tracked.

In an embodiment, the storage device 112 may store flight routes for UAVs, a database of UAV and UAV enclosure identifiers, UAV enclosure capacities etc.

It is understood that the storage device 112 may be implemented using memory contained in the host system computer 102 or may be a separate physical device. The storage device 112 is logically addressable as a consolidated data source across a distributed environment that includes the networks 110.

The host system computer 102 operates as a database server and coordinates access to application data including data stored in the storage device 112. The host system computer 102 may be implemented using one or more servers operating in response to a computer program stored in a storage medium accessible by the server. The host system computer 102 may operate as a network server (e.g., a web server) to communicate with the UAVs 104, UAV enclosures 106, and dispatch computer systems 108, as well as other network entities.

The UAVs 104 refer to unmanned aircrafts whose flights are autonomously controlled through onboard computer systems. In an embodiment, a portion of the flight control may be implemented remotely through interaction with a ground station. In an embodiment, the ground station may include a dispatch computer system 108, the host system computer 102, or other entity under the direction of the dispatch computer system 108 or host system 102. The UAVs 104 include physical components and related circuitry configured to pick up, carry, and drop off packages. In an embodiment, the UAVs 104 are electrically powered and are configured to be electrically rechargeable.

The UAVs 104 may include communication components, control processors, and memory (not shown). The memory may store order information and package routing information (e.g., origination/return point address and final destination point address). The control processor receives operational data from components of the UAVs 104, such as data indicating the activation of landing gear or the physical engagement of the landing gear at a UAV enclosure.

The communication components of the UAVs 104 may receive communications from the host system computer 102 and/or dispatch computer systems 108, as well as one or more UAV enclosures 106 over one or more of the networks 110. The communications may include instructions associated with package transport operations.

The UAV enclosures 106 are geographically dispersed around a defined geographic area and provide temporary housing, as well as recharging functions, for the UAVs 104. Each UAV enclosure 106 may include one or more cells, each of which is configured to house a UAV 104. The cells are described further herein. The UAV enclosures 106 may be operationally controlled by the host system computer 102, one or more dispatching computer systems 108, and/or one or more other UAV enclosures 106.

The dispatch computer systems 108 may each be implemented as a general-purpose desktop computer or may be high-speed computer processing devices. Each of the dispatch computer systems 108 may be operated by a different, independent seller entity, whereby the host system computer 102 is a third-party UAV network service provider that manages the network of UAVs and/or UAV enclosures and enables the seller entities to implement package transport activities through the network. A seller entity may access a web site of the host system computer 102 via a web browser operating on the computer systems 108. Alternatively, the host system computer 102 may be a seller enterprise, and each of the dispatch computer systems 108 may be operated by an affiliate of the seller of the host system computer 102 (e.g., a warehouse, distributor, re-seller, etc.).

The networks 110 may be any type of known networks including, but not limited to, a wide area network (WAN), a local area network (LAN), a global network (e.g. Internet), a virtual private network (VPN), and an intranet. The networks 110 may be implemented using wireless networks or any kind of physical network implementation known in the art, e.g., using cellular, satellite, and/or terrestrial network technologies. The networks 110 may also include short range wireless networks utilizing, e.g., BLUETOOTH™ and WI-FI™ technologies and protocols. In one embodiment, the UAVs 104 communicate with the UAV enclosures 106 over a short-range wireless network, while the UAVs 104 communicate with other network entities, such as the host system computer 102 and/or corresponding dispatch computer system 108, over a long-range network (e.g., satellite or cellular).

Figure 2:
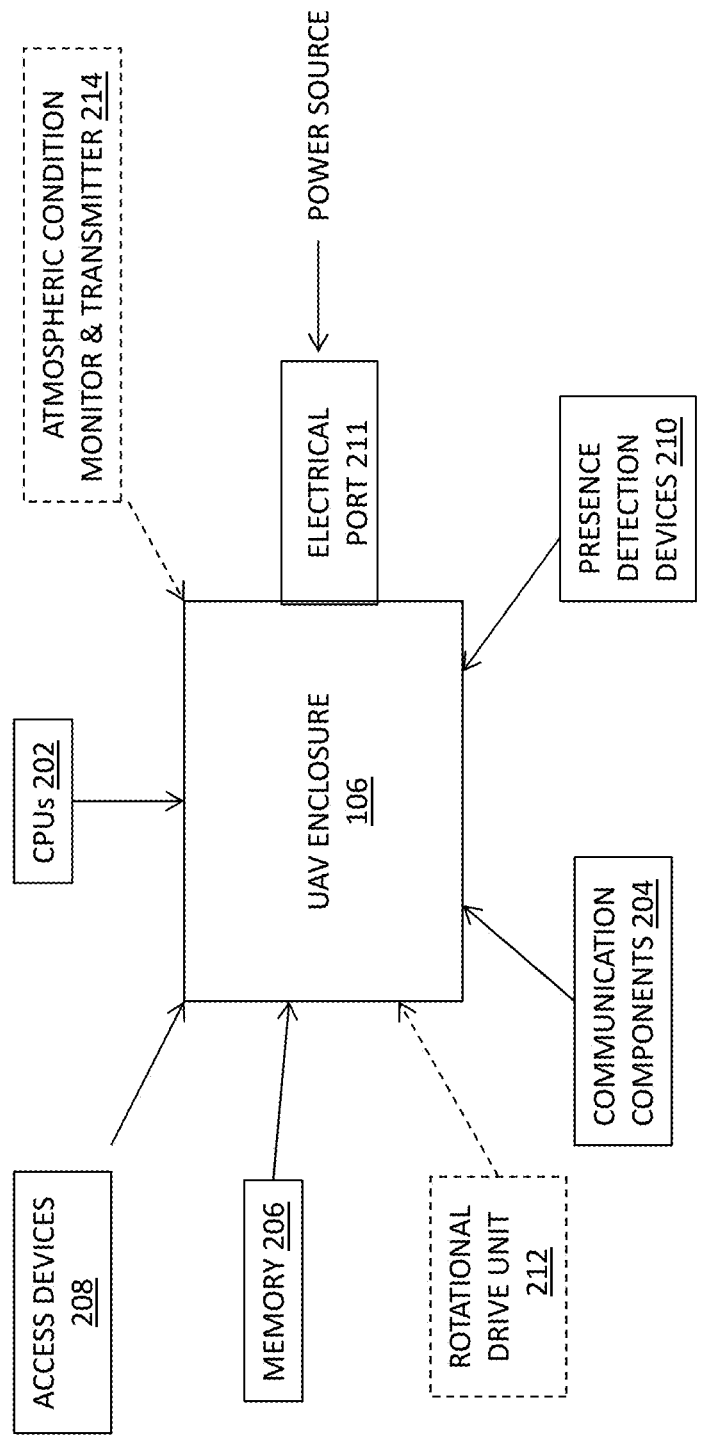
FIG. 2 depicts a block diagram of components of a UAV enclosure in accordance with an embodiment.

Turning now to FIG. 2, a block diagram illustrating components of a UAV enclosure 106 will now be described. In addition to electrical circuitry, the UAV enclosure 106 includes one or more CPUs 202, communication components 204 (also referred to herein as a communication network interface), memory 206, a plurality of access devices 208 (also referred to herein as access points), presence detection devices 210, and electrical ports 211. In addition, the UAV enclosure 106 optionally includes a rotational drive unit 212 and an atmospheric condition monitor and transmitter 214. The UAV enclosure 106 may be affixed to a structure that provides electrical power thereto. As shown in FIG. 2, for example, an electrical power source is coupled to the UAV enclosure 106 through an electrical port 211 of the UAV enclosure 106. Structures that may be used in providing electrical power to the UAV enclosures 106 are described further in FIGS. 4 and 5.

The CPUs 202 execute logic to enable communications and functions both internal and external to the UAV enclosure 106. The logic is configured to track activities conducted for the UAV enclosure 106, such as recharging, cell capacities, cell reservations, system health status, and power availability, to name a few.

In an embodiment, the memory 206 stores an enclosure ID, access codes, and activity logs (e.g., recharging status, capacities, vacancies, reservations). The memory 206 may also store logic executable by the computer processor 202 to track recharging activities, communicate with other enclosures to calculate a best route to a final destination, communicate with UAVs/enclosures to exchange routing information, capacity, and access information, to name a few. Alternatively, this information can be transmitted to a centralized system that oversees the distributed network (e.g., host system computer 102) or a corresponding dispatch computer system 108, if an entity operating the dispatch computer system 108 directly manages the activities of a set of UAVs 104 and/or UAV enclosures 106.

The communications components 204 of the UAV enclosure 106 may include wireless and wireline components, hardware (e.g., transmitters and receivers), as well as related circuitry to enable communications among the components of the UAV enclosure 106, as well as external communications between the UAV enclosure 106 and other network entities (e.g., UAVs 104, other UAV enclosures 106, the host system computer 102, and/or the dispatch computer systems 108). In an embodiment, UAVs 104 may periodically broadcast their coordinates to UAV enclosures 106 within signal range. The communication components 204 may include an antenna configured to send and receive communications with respect to the UAVs 104 over a short-range network (e.g., BLUETOOTH). For example, the communications components 204 may be used to coordinate docking activities for authorized UAVs 104. Further, upon completing a recharge operation, the UAV enclosure 106 may send dispatch instructions to the UAV 104 to proceed with a travel route. The travel route may be stored in the UAV 104 upon its initial dispatch and may be updated at each UAV enclosure 106, e.g., if its route is changed due to circumstances, such as power failures at a UAV enclosure, an unexpected surge or change in volume of dispatched UAVs, and weather conditions affecting travel, to name a few.

The access devices 208 are structures configured to activate in order to receive a UAV 104 that is docking at the UAV enclosure 106. The access devices 208 provide an opening to the cells of the UAV enclosures 106 to receive an incoming UAV 104, as well as provide security for the UAV 104 from unauthorized use or inclement weather conditions. The access devices 208 are further configured to receive dispatch instructions from the UAV enclosure 106 to enable the dispatch operation.

The presence detection devices 210 include one or more detection sensors that are configured to detect a landing function of the UAV 104, as well as a continued presence of the UAV 104 at the enclosure 106. For example, the detection sensor may be a weight sensor that is disposed on the landing surface of the UAV enclosure 106, and/or may include a motion sensor. The detection of weight (or motion) may indicate to the UAV enclosure 106 that the UAV 104 has landed.

The electrical ports 211 provide a connector for receiving electrical power from a power source. The electrical ports 211 may be installed within each of the cells of the UAV enclosure 106 and may be interconnected to each other and to a main power source.

The rotational drive unit 212 may be implemented using electro-mechanical components (e.g., a motor and drive shaft), as well as a computer processor and associated circuitry, and enables the UAV enclosure 106 to rotate about a vertical axis of the UAV enclosure 106. The atmospheric condition monitor and transmitter 214 tracks atmospheric conditions and communicates these conditions to the UAV enclosure 106, such that the information is used by the UAV enclosure 106 to determine when and how to position (e.g., rotate) the UAV 106, through the rotational drive unit 212, to receive or dispatch a UAV 104. The atmospheric condition monitor and transmitter 214 may be a commercial or proprietary device that is capable of measuring various atmospheric conditions, such as humidity, barometric pressure, wind speed, wind direction, temperature, etc. The rotational drive unit 212 is described further in FIG. 6.

Figure 3:
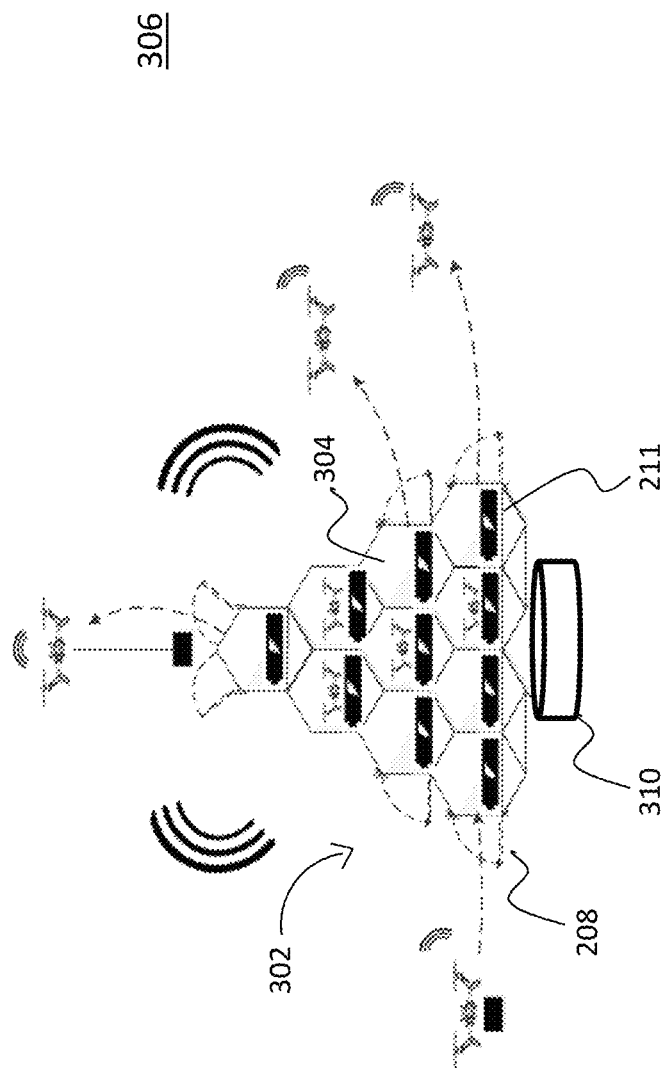
FIG. 3 depicts a perspective view of a UAV enclosure in accordance with an embodiment.

FIG. 3 illustrates a perspective view of a UAV enclosure 306, which corresponds to the enclosure 106 of FIG. 1, in accordance with one embodiment. The UAV enclosure 306 includes a housing 302, which has a substantially beehive shape (e.g., conical in shape and having a wider diameter at the base end that tapers off from the base end to the top). The UAV enclosure 306 includes a plurality of cells 304 for receiving and housing a UAV 104. The cells 304 are configured as substantially hollow receptacles having a docking or landing surface, and access devices 208. The housing 302 may be made of any sturdy, weather resistant materials, such as plastic. Any number of cells 304 desired may be configured for a particular UAV enclosure 306. The cells 304 may be modular to allow customized configurations. Thus, the hive shape is shown by way of illustration and is not to be interpreted as limiting in scope. The cells 304 may be polygonal in shape and are shown in FIG. 3 as pentagonal. The UAV enclosure 306 may be dynamically configured to adjust to varying requirements. The shape of the UAV enclosure 306 can be varied to accommodate a number of cells needed, a mounting location, or even esthetic design purposes.

The UAV enclosure 306 includes a base 310, which may be configured to physically couple the UAV enclosure 306 to a structure. In an embodiment, the base 306 houses the rotational drive unit 212 described herein.

The access devices 208 may be configured as portal coverings that open and close and are capable of being activated through electrical circuitry to allow a UAV 104 to dock and dispatch therefrom. As indicated above, the access devices 208 provide protection for the UAVs 104, as well as any packages carried by the UAVs 104, with respect to environmental conditions. In addition, the access devices 208 may be configured to activate (open or close) in response to a security mechanism that ensures only authorized UAV docking is performed and to prohibit theft or vandalism.

The access devices 208 are affixed to corresponding cells 304 by any fixing means that enable the devices 208 to open and close with respect to the cell openings. For example, the access devices 208 may be affixed using a hinge and locking mechanism to maintain a closed position during the time a UAV is docked. The hinge, or other fixing mechanism, may be disposed such that the access devices 208 open from side to side, top to bottom, or bottom to top. The locking mechanism of the access devices 208 is configured to receive instructions to open, close and lock the access devices when directed.

The access devices 208 may be opened using a security key or access code. The security key or access code may be exchanged between, e.g., a dispatching UAV enclosure 106 from which a UAV 104 has been dispatched, and a receiving UAV enclosure 106 that has accepted and reserved a cell 304 for docking the UAV 104 upon arrival at the UAV enclosure 106. The security key or access code may be stored in the memory 206 and retrieved for verification. Alternatively, the access code can be generated by the host system computer 102 or dispatch computer system 108 and stored in the memory of the UAV 104 prior to its initial dispatch. The UAV enclosures 106 in the network may be configured to authenticate any access code generated by the host system computer 102 or the dispatch computer system 108.

In an embodiment, the network of UAVs 104 and UAV enclosures 106 may communicate and exchange information to create travel routes and refine the routes in response to UAV enclosure capacities, as described herein.

Figure 4:
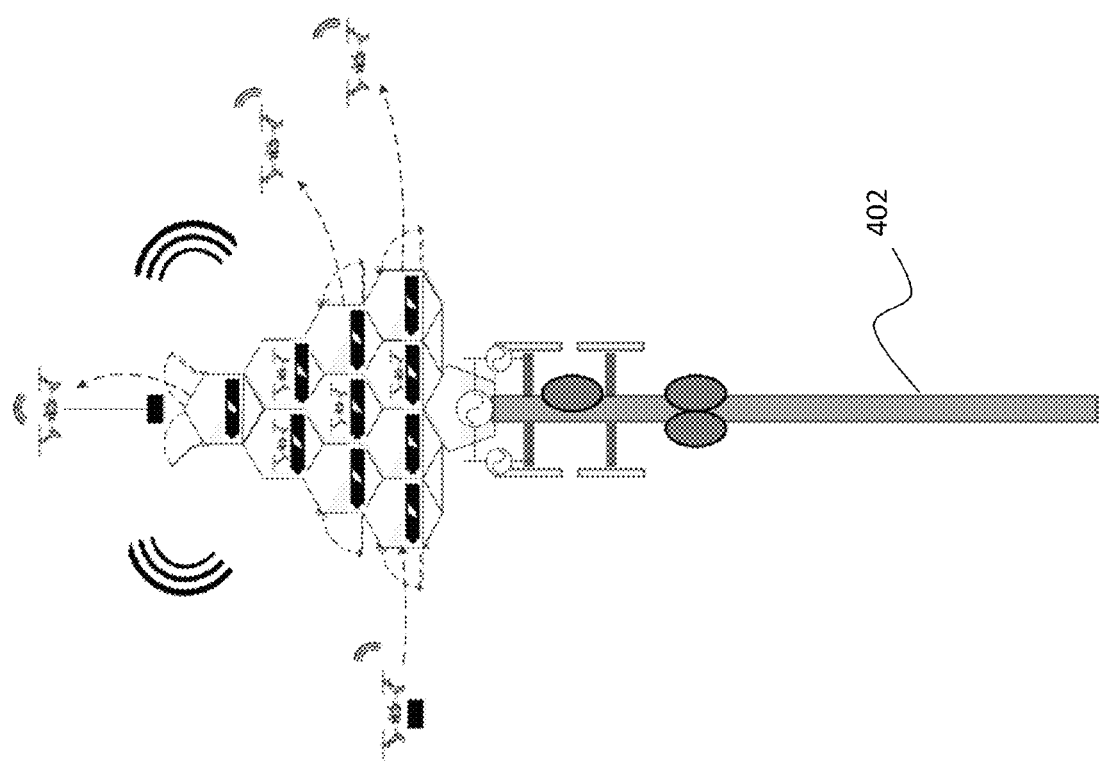
FIG. 4 depicts a sample fixed-location structure used for accommodating a UAV enclosure in accordance with another embodiment.

As indicated above, the UAV enclosures 106 may be geographically distributed around a defined geographic region. In an embodiment, the UAV enclosures 106 are disposed at fixed locations (e.g., affixed to existing infrastructure, such as telephone polls, street signs, and cell towers, to name a few). The placement of UAV enclosures 106 at higher altitude locations provides greater security in that they are not readily accessible to unauthorized individuals. In addition, flight routes and pathways of UAVs 106, which may be regulated for specified altitudes, are facilitated by the placement of the UAV enclosures 106 at higher structures. As shown in FIG. 4, a sample structure to which a UAV may be mounted is a cell tower 402. The UAV enclosure 106 may be affixed to the structure via the base, which can be configured to be adjustable to fit different-sized structures. The base (e.g., base 310 of FIG. 3) may include an electrical port 211 to receive electrical power from the structure 402.

There may be situations in which a greater number of UAVs 104 are needed for a temporary period of time (e.g., increases in demand for package deliveries). In this scenario, mobile structures (e.g., vehicles) can be used to transport the UAVs 104 and enclosures 106 to needed locations within the geographic area. As shown in FIGS. 5A-5F sample mobile structures include a flat bed truck (with or without a trailer) FIGS. 5A-5B, a trailer FIG. 5C, a train car FIG. 5D, a boat FIG. 5E, and vehicle having an elevated platform FIG. 5F. Any of these vehicles may be equipped with platforms that are capable of being raised with the UAV enclosures 106 to accommodate a height that facilitates take off and landings of UAVs 104. Once the need for the additional UAVs 104 and enclosures 106 has subsided, and the UAV enclosures 106 have successfully tracked the return of each of the UAVs 104 carried thereon, the vehicles may then leave the site and, in some cases, transfer the UAVs 104 and enclosures 106 to another desired geographic location for dispatch or further instructions. In an embodiment, the host system computer 102 computes the increased need for UAVs 104, transmits routing instructions to the UAVs 104, and coordinates the routing and placement of the mobile structures to accommodate the increased need.

In addition, in an embodiment, at least some of the UAVs 104 on the vehicles may be pre-loaded with packages scheduled for deliveries.

As described herein, in an embodiment, the UAV enclosure may be configured to rotate about a vertical axis to accommodate landings and dispatch operations of UAVs 104. In an embodiment, the base of the UAV enclosure 106 includes a rotational drive unit 212 that receives instructions from the CPU 202 of the UAV enclosure (e.g., one of the CPUs 202 in one of the cells 304 acting as a central controller for the UAV enclosure 106) to rotate a specific number of degrees about the vertical axis. In an embodiment, the rotational drive unit 212 may be configured to rotate a full 360 degrees. The determination of the amount of rotation may be influenced by data received from the atmospheric condition monitor and transmitter 214, which is in close proximity of (or, alternatively, attached to) the UAV enclosure 106. The atmospheric condition monitor and transmitter 214 includes components for collecting weather data, e.g., humidity, wind speed, wind direction, heat, etc.). The data is transmitted to the UAV enclosure 106, and the CPU 202 logic determines if the rotation is desired to accommodate a UAV landing or dispatch. For example, if wind speeds exceed a threshold level in a northerly direction, the UAV enclosure 106 may rotate such that the receiving cell is facing the wind and the UAV 104 is traveling with the wind direction. Alternatively, if weather conditions indicate a rain event whereby the wind is carrying the rain in a northerly direction, the UAV enclosure 106 may be rotated such that the receiving cell is facing in a southerly direction to avoid the rain elements. By way of illustration, FIG. 6 depicts a UAV enclosure and rotational drive unit 212 that is communicatively coupled to a nearby atmospheric condition monitor and transmitter 214.

Figure 7:
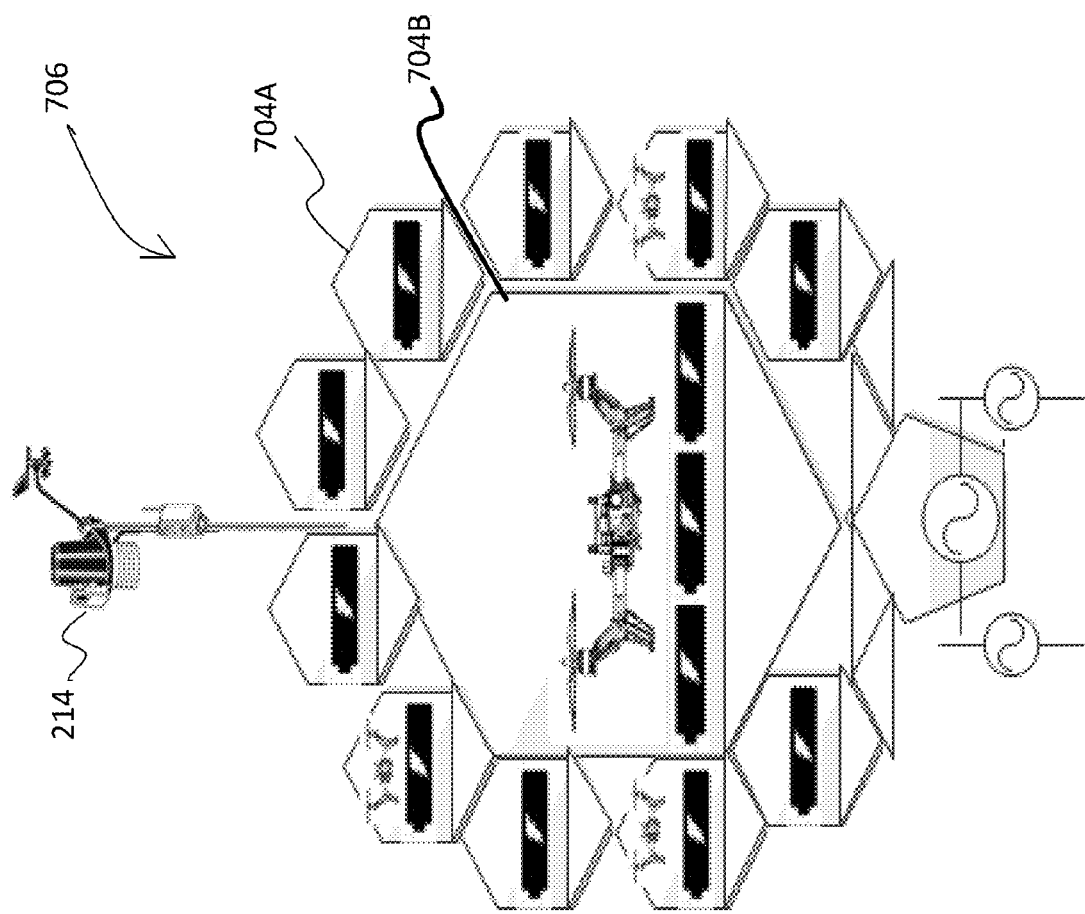
FIG. 7 depicts a view of a UAV enclosure in accordance with another embodiment.

Turning now to FIG. 7, a UAV enclosure 706, which corresponds to the enclosure 106 of FIG. 1, in an alternative embodiment will now be described. As shown in FIG. 7, the UAV enclosure 706 has a substantially circular shape with same-sized cells 704A disposed around a larger cell 704B. The larger cell 704B may include circuitry to recharge a larger, more energy-dependent UAV 104. Also, as shown in FIG. 7, the atmospheric condition monitor and transmitter 214 is disposed directly on the enclosure 706.

Figure 8:
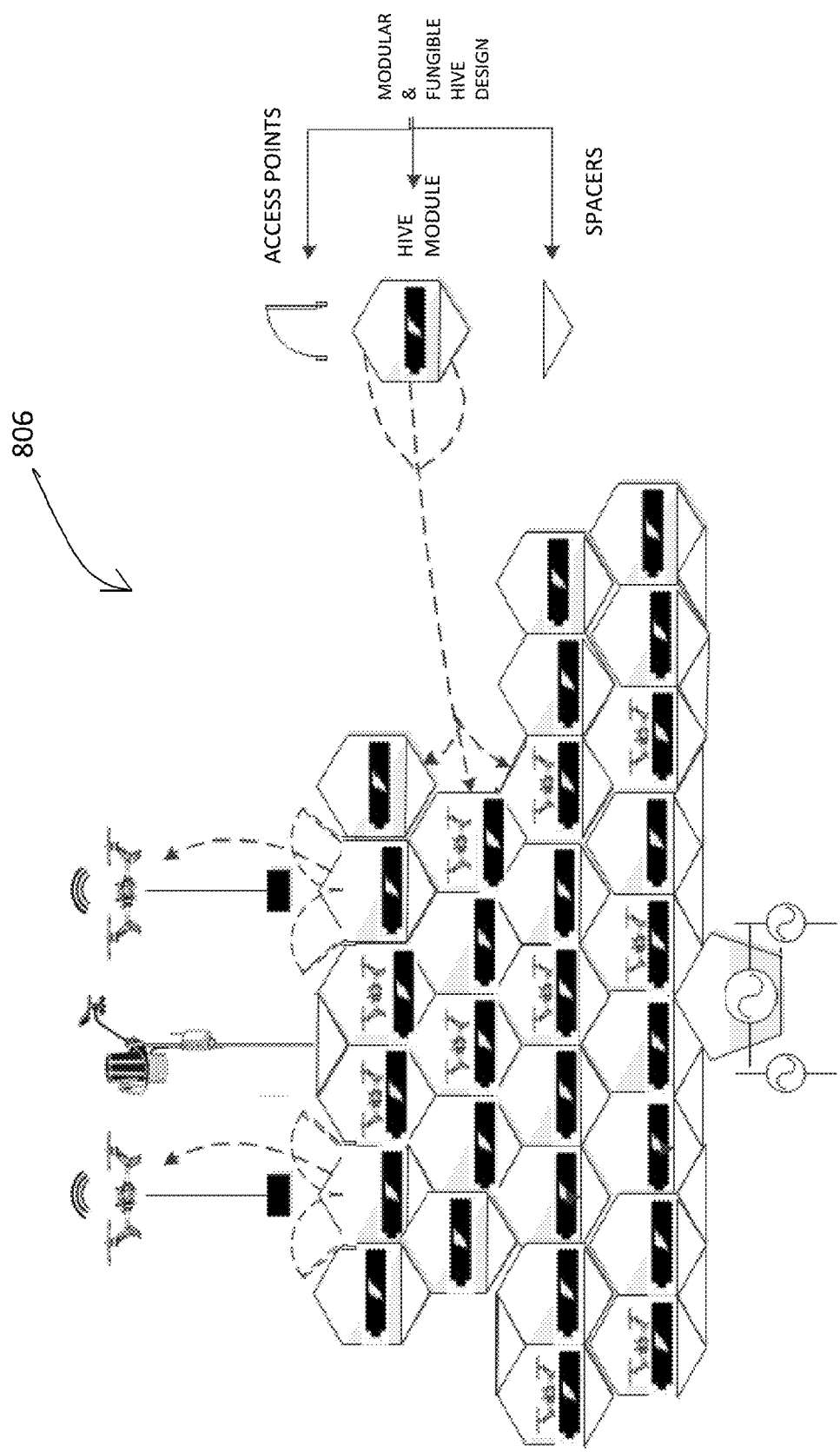
FIG. 8 depicts a view of a UAV enclosure in accordance with yet a further embodiment.

FIG. 8 depicts another embodiment of a UAV enclosure 806, which corresponds to the enclosure 106 of FIG. 1. The enclosure 806 is modular in design such that its cell capacity can be dynamically increased or decreased as needed. The cells have a pentagonal shape, and each of the cells may be separated by spacers that provide support for the cell configuration. The access devices 208 can be configured such that the cells receive a UAV 104 from the top of the cell (e.g., if the cell is located at the top of the enclosure 806) or from the side of the cell. The configurable nature of the enclosure 806 facilitates installation of the enclosure 806 at any type of structure, regardless of its shape or size.

Figure 9:
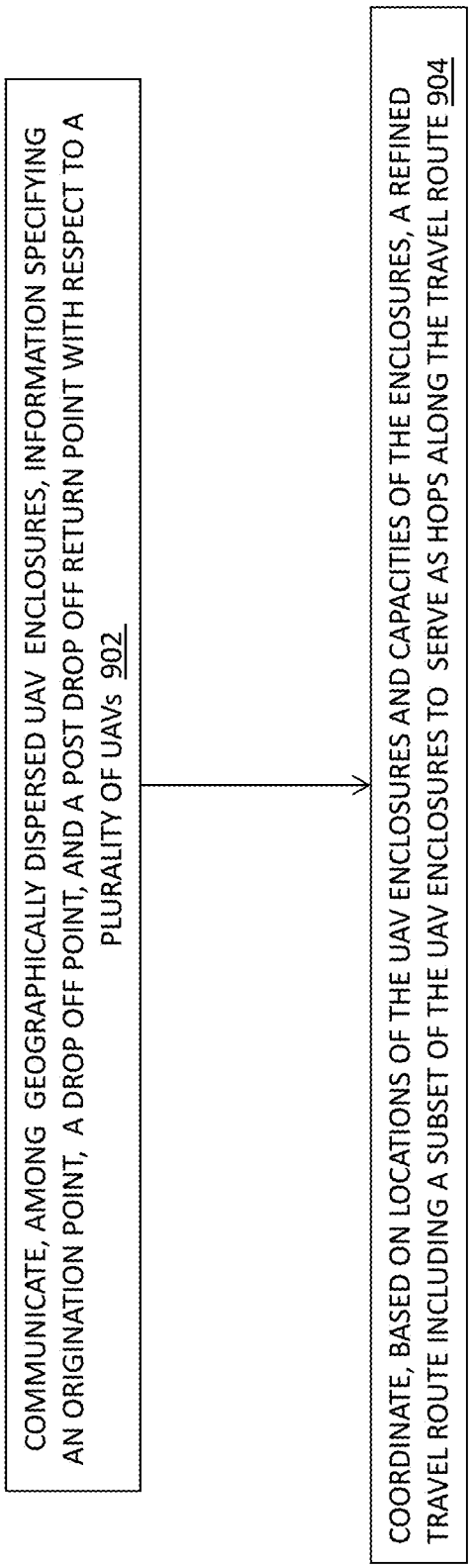
FIG. 9 depicts a flow diagram of a process for implementing the UAV distributed package transport system in accordance with an embodiment.

Turning now to FIG. 9, a flow diagram describing a process for implementing the distributed package transport services will now be described. The process of FIG. 9 assumes that a plurality of UAVs 104 have been geographically dispersed within a geographic area. Some of the UAVs 104 may be docked, waiting recharging, and others may be in transit.

At block 902, the UAVs 104 and enclosures 106 in the geographical area communicate with one another information specifying an origination point, a package drop off point, and a post-drop off return point with respect to the travel routes configured for the UAVs. At least one of the UAV enclosures has been dynamically assigned to a location (e.g., the UAV transported by vehicle to the location for a specified period of time). The UAV enclosures 106 track the capacities of the cells based on presence detection signals received from the presence detection devices and determine any vacancies. The UAV enclosures 106 further track the recharging status of the UAVs in order to determine how long a given UAV will remain docked at the UAV before proceeding on the designated travel route.

At block 904, the UAV enclosures 106 coordinate, based on locations and capacities of the UAV enclosures 106, and define a refined travel route including a subset of the UAV enclosures 106 to serve as hops for the UAVs. The UAV enclosures reserve cells based on an acceptance by the UAV enclosures 106 for requests received from other UAV enclosures 106 for UAV docking. The enclosures verify identities of UAVs attempting a docking process in response to the acceptance of the requests and activate cell opening apparatus to receive and dispatch UAVs.

Technical effects and benefits include the ability to provide a distributed network of UAV-implemented package transport services. The distributed package transport services extend the range and flight time indefinitely by modifying existing infrastructure, as well as dynamically assigned mobile vehicles, to house UAV enclosures, or hives. UAV enclosures may communicate with each other to calculate flying time of UAVs and the fewest number of hops to ensure delivery range and completion of transport functions. The enclosures may be secured allowing only authorized UAVs to enter the enclosures to utilize its services The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A distributed package transport system, comprising:
   a plurality of unmanned aerial vehicles (UAVs), each of which is configured to transport packages within a geographic area and along a travel route that includes an origination point, a package drop off point, and a post-drop off return point;
   a plurality of UAV enclosures geographically dispersed within the geographic area, the UAV enclosures each comprising a plurality of cells and a rotational drive unit to rotate a UAV enclosure about a vertical axis of the UAV enclosure, each of the cells comprising a receptacle for providing temporary housing to a corresponding UAV, the receptacle having electrical circuitry to recharge the corresponding UAV, wherein at least one of the plurality of UAV enclosures is dynamically assigned to a location within the geographic area; and
   a plurality of structures communicatively coupled to corresponding UAV enclosures, the UAV enclosures configured to recharge the UAVs by electrical power provided by the structures through the electrical circuitry of the cells of the UAV enclosures;
   wherein each of the plurality of UAV enclosures includes a computer processor and communication network interface and, for each of the UAVs in transit, the UAV enclosures communicate information specifying the origination point, the drop off point, and the return point amongst each other and coordinate to define, based on locations of the UAV enclosures and capacities of the UAV enclosures, a refined travel route including a subset of the UAV enclosures to serve as hops, wherein the subset of the UAV enclosures for the refined travel route is selected based at least on a calculation minimizing a number of hops between UAV enclosures.

2. The distributed package transport system of claim 1, wherein the UAV enclosures are disposed at a minimum specified height with respect to the structures, the minimum specified height defined, in part, as a function of government-imposed UAV flight regulations.

3. The distributed package transport system of claim 1, wherein at least one of the structures is a mobile vehicle, and the dynamic assignment of the at least one of the plurality of UAVs to the location includes determining capacities of the UAV enclosures disposed within a specified range of the geographic area, and transporting the at least one of the plurality of UAV enclosures to the location via the mobile vehicle for a specified period of time, when the determined capacities meets a threshold level.

4. The distributed package transport system of claim 1, wherein the cells further comprise presence detection devices and the computer processors of the UAV enclosures are configured to:
   track the capacities of the cells based on presence detection signals received from the presence detection devices, the tracking including determining any vacancies.

5. The distributed package transport system of claim 1, wherein the computer processors of the UAV enclosures are configured to:
   reserve the cells based on acceptance by the computer processors of requests received from other UAV enclosures for UAV docking;
   verify identities of UAVs attempting a docking process in response to the acceptance of the requests;
   activate cell opening apparatus to receive and dispatch UAVs; and
   track recharging statuses of UAVs docked in cells.

6. The distributed package transport system of claim 1, wherein the UAV enclosures are polygonal in shape, the cells of each of the UAV enclosures are configured in a honeycomb pattern, and the cells are disposed around a circumference of the UAV enclosures.

7. The distributed package transport system of claim 6, wherein the UAV enclosures are configured to rotate 360 degrees along a vertical axis of the UAV enclosures, such that a UAV enclosure is rotatable to a position determined by a corresponding computer processor based on pre-defined criteria.

8. A method for providing distributed package transport, the method comprising:
   communicating, among unmanned aerial vehicle (UAV) enclosures that are geographically dispersed within a geographic area, information specifying an origination point, a package drop off point, and a post-drop off return point with respect to a plurality of UAVs, each of the UAVs configured to transport packages within the geographic area and along a travel route that includes the origination point, the package drop off point, and the post-drop off return point, UAV enclosures each comprising a computer processor, communication network interface, and a plurality of cells and a rotational drive unit to rotate a UAV enclosure about a vertical axis of the UAV enclosure, each of the cells comprising a receptacle for providing temporary housing to a corresponding UAV, the receptacle having electrical circuitry to recharge the corresponding UAV;

dynamically assigning at least one of the UAV enclosures to a location within a geographic area;

communicatively coupling each of the plurality of UAV enclosures to a corresponding structure, the UAV enclosures configured to recharge the UAVs by electrical power provided by the structures through the electrical circuitry of the cells of the UAV enclosures; and coordinating, based on locations of the UAV enclosures and capacities of the UAV enclosures, a refined travel route including a subset of the UAV enclosures to serve as hops, wherein the subset of the UAV enclosures for the refined travel route is selected based on at least a calculation minimizing a number of hops between UAV enclosures.

9. The method of claim 8, wherein the UAV enclosures are disposed at a minimum specified height with respect to the structures, the minimum specified height defined, in part, as a function of government-imposed UAV flight regulations.

10. The method of claim 8, wherein at least one of the structures is a mobile vehicle, and dynamic assignment of the at least one of the plurality of UAVs to the location includes determining capacities of the UAV enclosures disposed within a specified range of the geographic area, and transporting the at least one of the plurality of UAV enclosures to the location via the mobile vehicle for a specified period of time, when the determined capacities meets a threshold level.

11. The method of claim 8, further comprising:
tracking the capacities of the cells based on presence detection signals received from presence detection devices, the tracking including determining any vacancies.

12. The method of claim 8, further comprising:
reserving the cells based on acceptance by the computer processors of requests received from other UAV enclosures for UAV docking;
verifying identities of UAVs attempting a docking process in response to the acceptance of the requests;
activating cell opening apparatus to receive and dispatch UAVs; and
tracking recharging statuses of UAVs docked in cells.

13. The method of claim 8, wherein the UAV enclosures are polygonal in shape, the cells of each of the UAV enclosures are configured in a honeycomb pattern, and the cells are disposed around a circumference of the UAV enclosures.

14. The method of claim 13, wherein the UAV enclosures are configured to rotate 360 degrees along a vertical axis of the UAV enclosures, such that a UAV enclosure is rotatable to a position determined by a corresponding computer processor based on pre-defined criteria.

15. A computer program product comprising:
a tangible storage medium readable by processing circuits of a distributed package transport system and storing instructions for execution by the processing circuits to perform a method, comprising:
communicating, among unmanned aerial vehicle (UAV) enclosures that are geographically dispersed within a geographic area, information specifying an origination point, a package drop off point, and a post-drop off return point with respect to a plurality of UAVs, each of the UAVs configured to transport packages within the geographic area and along a travel route that includes the origination point, the package drop off point, and the post-drop off return point, UAV enclosures each comprising a computer processor, communication network interface, and a plurality of cells and a rotational drive unit to rotate a UAV enclosure about a vertical axis of the UAV enclosure, each of the cells comprising a receptacle for providing temporary housing to a corresponding UAV, the receptacle having electrical circuitry to recharge the corresponding UAV;

dynamically assigning at least one of the UAV enclosures to a location within a geographic area;

communicatively coupling each of the plurality of UAV enclosures to a corresponding structure, the UAV enclosures configured to recharge the UAVs by electrical power provided by the structures through the electrical circuitry of the cells of the UAV enclosures; and coordinating, based on locations of the UAV enclosures and capacities of the UAV enclosures, a refined travel route including a subset of the UAV enclosures to serve as hops, wherein the subset of the UAV enclosures for the refined route is selected based on at least a calculation minimizing a number of hops between UAV enclosures.

16. The computer program product of claim 15, wherein the UAV enclosures are disposed at a minimum specified height with respect to the structures, the minimum specified height defined, in part, as a function of government-imposed UAV flight regulations.

17. The computer program product of claim 15, wherein at least one of the structures is a mobile vehicle, and dynamic assignment of the at least one of the plurality of UAVs to the location includes determining capacities of the UAV enclosures disposed within a specified range of the geographic area, and transporting the at least one of the plurality of UAV enclosures to the location via the mobile vehicle for a specified period of time, when the determined capacities meets a threshold level.

18. The computer program product of claim 15, wherein the method further comprises:
tracking the capacities of the cells based on presence detection signals received from presence detection devices, the tracking including determining any vacancies.

19. The computer program product of claim 15, wherein the method further comprises:
reserving the cells based on acceptance by the computer processors of requests received from other UAV enclosures for UAV docking;
verifying identities of UAVs attempting a docking process in response to the acceptance of the requests;
activating cell opening apparatus to receive and dispatch UAVs; and
tracking recharging statuses of UAVs docked in cells.

20. The computer program product of claim 15, wherein the UAV enclosures are polygonal in shape, the cells of each of the UAV enclosures are configured in a honeycomb pattern, and the cells are disposed around a circumference of the UAV enclosures.

* * * * *